United States Patent
Nagaraja et al.

(10) Patent No.: US 10,728,950 B2
(45) Date of Patent: Jul. 28, 2020

(54) BEAM TRAINING FOR DISCONTINUOUS RECEPTION (DRX) MODE OPERATION

(71) Applicant: QUALCOMM Incorporated, San Diego, CA (US)

(72) Inventors: Sumeeth Nagaraja, San Diego, CA (US); Tao Luo, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 15/684,459

(22) Filed: Aug. 23, 2017

(65) Prior Publication Data

US 2018/0063883 A1  Mar. 1, 2018

Related U.S. Application Data

(60) Provisional application No. 62/380,306, filed on Aug. 26, 2016.

(51) Int. Cl.
*H04W 76/28* (2018.01)
*H04W 52/02* (2009.01)
(Continued)

(52) U.S. Cl.
CPC .......... *H04W 76/28* (2018.02); *H04L 5/0048* (2013.01); *H04W 16/32* (2013.01); *H04W 24/10* (2013.01); *H04W 52/0216* (2013.01); *H04W 72/046* (2013.01); *H04B 7/0695* (2013.01); *H04B 7/088* (2013.01); *H04W 88/02* (2013.01); *H04W 88/08* (2013.01); *Y02D 70/00* (2018.01); *Y02D 70/10* (2018.01); *Y02D 70/12* (2018.01); *Y02D 70/126* (2018.01); *Y02D 70/1242* (2018.01);
(Continued)

(58) Field of Classification Search
CPC ............ H04W 76/28; H04W 52/0216; H04W 72/046; H04W 24/10; H04W 88/08; H04W 88/02; H04W 72/085; H04W 16/28; H04L 5/0048; H04B 7/0695; H04B 7/088; H04B 7/0617
See application file for complete search history.

(56) References Cited

U.S. PATENT DOCUMENTS 10,045,193 B2 * 8/2018 Koorapaty ............ H04W 48/12
2014/0128109 A1    5/2014 Li et al.
(Continued)

FOREIGN PATENT DOCUMENTS

EP     3151622 A1    4/2017
WO  2015182742 A1  12/2015

OTHER PUBLICATIONS

International Search Report and Written Opinion—PCT/US2017/048364—ISA/EPO—dated Nov. 30, 2017.

*Primary Examiner* — Nam T Huynh
(74) *Attorney, Agent, or Firm* — Steven R. Thiel

(57) ABSTRACT

Aspects of the present disclosure relate to wireless communications and, more particularly, to configuration of reference signals for beam refinement, based on DRX parameters. For example, a method of wireless communications by a base station may include determining a reference signal configuration for a user equipment (UE) based, at least in part, on one or more discontinuous reception (DRX) parameters, and signaling the reference signal configuration and the one or more DRX parameters to the UE.

30 Claims, 9 Drawing Sheets

(51) Int. Cl.
    *H04L 5/00*          (2006.01)
    *H04W 16/32*       (2009.01)
    *H04W 24/10*       (2009.01)
    *H04W 72/04*       (2009.01)
    H04B 7/06         (2006.01)
    H04B 7/08         (2006.01)
    H04W 88/02       (2009.01)
    H04W 88/08       (2009.01)

(52) U.S. Cl.
    CPC ...... *Y02D 70/1262* (2018.01); *Y02D 70/1264* (2018.01); *Y02D 70/142* (2018.01); *Y02D 70/146* (2018.01); *Y02D 70/20* (2018.01); *Y02D 70/21* (2018.01); *Y02D 70/24* (2018.01); *Y02D 70/26* (2018.01)

(56) References Cited

U.S. PATENT DOCUMENTS

2014/0198696 A1     7/2014   Li et al.
2015/0078189 A1*  3/2015   Kwon ............... H04W 52/0216
                                                        370/252
2018/0041319 A1*  2/2018   Cheng .................. H04L 5/0048

\* cited by examiner

BEAM TRAINING FOR DISCONTINUOUS RECEPTION (DRX) MODE OPERATION

CLAIM OF PRIORITY UNDER 35 U.S.C. § 119

The present application for patent claims benefit of U.S. Provisional Patent Application Ser. No. 62/380,306, filed Aug. 26, 2016, assigned to the assignee hereof and hereby expressly incorporated by reference herein.

BACKGROUND

Field of the Disclosure

Aspects of the present disclosure generally relate to wireless communication and, more particularly, to reference signal configuration for beam selection and refinement.

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system may simultaneously support communication for multiple wireless terminals. Each terminal communicates with one or more base stations via transmissions on the forward and reverse links. The forward link (or downlink) refers to the communication link from the base stations (e.g., Node B, evolved Node B (eNB), Access Point (AP), Base Station Transceiver (BST), Transmit/Receive Point (TRP)) to the terminals, and the reverse link (or uplink) refers to the communication link from the terminals to the base stations. This communication link may be established via a single-input single-output, multiple-input single-output or a multiple-input multiple-output (MIMO) system.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Certain aspects of the present disclosure provide a method for wireless communication by a base station. The method generally includes determining a reference signal configuration for a user equipment (UE) based, at least in part, on one or more discontinuous reception (DRX) parameters, and signaling the reference signal configuration and the one or more DRX parameters to the UE.

Certain aspects of the present disclosure provide a method for wireless communication by a user equipment (UE). The method generally includes receiving signaling, from a base station, of a reference signal configuration that is based, at least in part, on one or more discontinuous reception (DRX) parameters, and performing beam training with the base station, during a DRX on period or prior to the DRX on period, in accordance with the reference signal configuration.

Aspects generally include methods, apparatus, systems, computer program products, and processing systems, as substantially described herein with reference to and as illustrated by the accompanying drawings.

Other aspects, features, and embodiments of the present invention will become apparent to those of ordinary skill in the art, upon reviewing the following description of specific, exemplary aspects of the present invention in conjunction with the accompanying figures. While features of the present disclosure may be discussed relative to certain aspects and figures below, all embodiments of the present disclosure may include one or more of the advantageous features discussed herein. In other words, while one or more aspects may be discussed as having certain advantageous features, one or more of such features may also be used in accordance with the various aspects of the disclosure discussed herein. In similar fashion, while exemplary aspects may be discussed below as device, system, or method aspects it should be understood that such exemplary aspects may be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
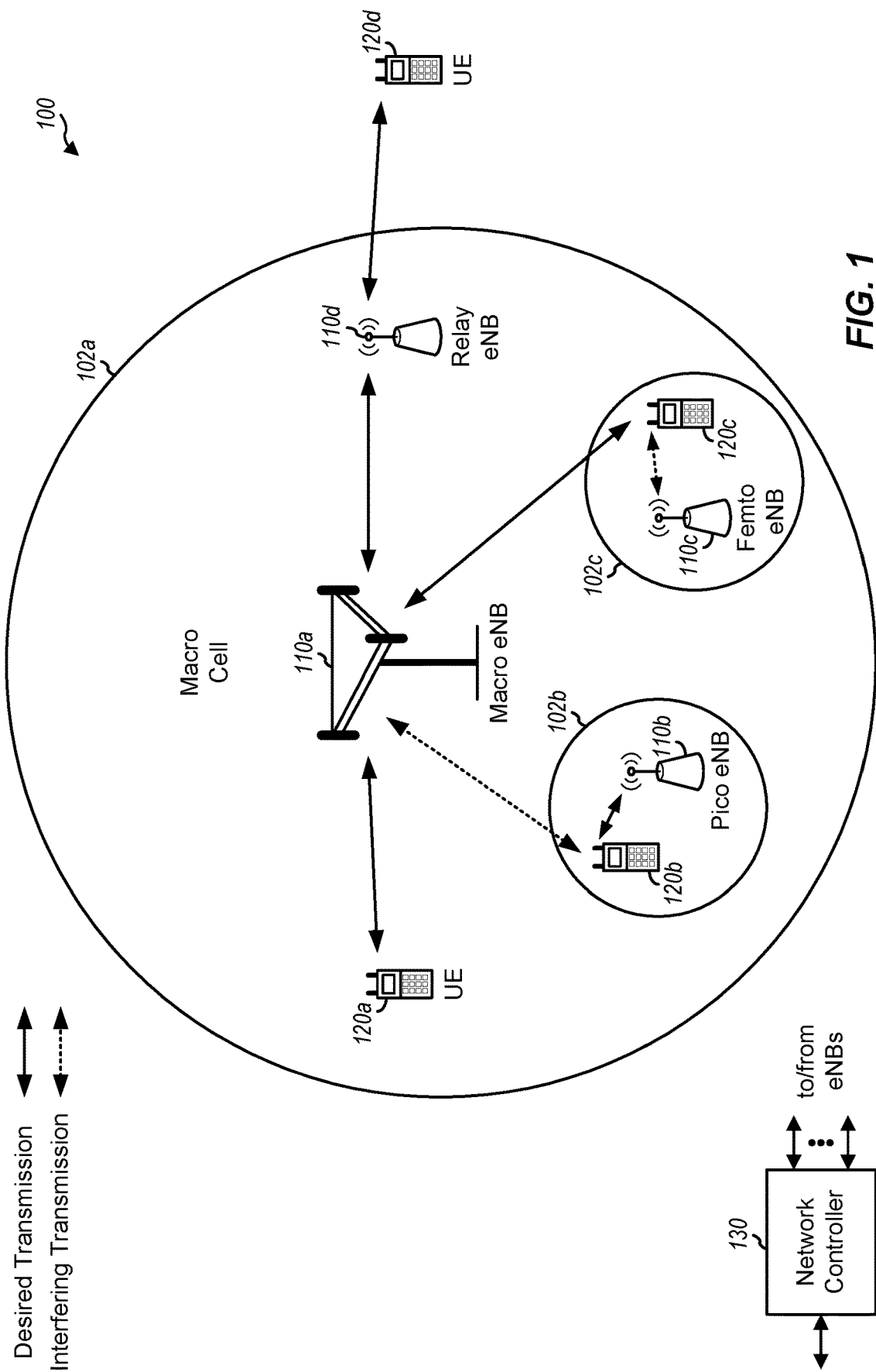
FIG. 1 illustrates an example of a wireless communication network, in accordance with certain aspects of the present disclosure.

Aspects of the present disclosure relate to configuration of reference signals that may provide measurements and may be used in a beam management and refinement procedures such as, for example, during on periods of a discontinuous reception (DRX) mode of operation.

As described herein, spectrum bands in high frequencies (e.g., 28 GHz, may be referred to as millimeter-wave (mmWave)) provide large bandwidths capable of delivering multi-Gbps data rates, as well as extremely dense spatial reuse which may increase capacity. At higher frequencies, in which mmWaves operate, small wavelengths enable a large number of antenna elements in a relatively small form factor. This characteristic of mmWave may be leveraged to form directional beams that may send and receive more energy to overcome propagation and path loss challenges. These beams may also be utilized for spatial reuse.

mmWave communications bring gigabit speeds to cellular networks, due to availability of large amounts of bandwidth. The unique challenges of heavy path-loss faced by millimeter-wave systems necessitate new techniques such as hybrid beamforming (analog and digital), which are not present in 3G and 4G systems. Hybrid beamforming may enhance link budget/SNR that may be exploited during the RACH.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Some examples of UEs may include cellular phones, smart phones, personal digital assistants (PDAs), wireless modems, handheld devices, tablets, laptop computers, netbooks, smartbooks, ultrabooks, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link.

It is noted that while aspects may be described herein using terminology commonly associated with 3G and/or 4G wireless technologies, aspects of the present disclosure can be applied in other generation-based communication systems, such as 5G and later.

Example Wireless Communications Network

FIG. 1 illustrates an example wireless communication network 100, in which aspects of the present disclosure may be practiced. Techniques presented herein may be used for beam refinement, for example, during on periods of a discontinuous reception (DRX) mode of operation.

For example, NB 110 (eNB, BS, AP, TRP) may receive a message via a first beam from UE as part of a RACH procedure and may transmit at least one signal for further refining the first beam during the RACH procedure. Correspondingly, a UE 120 may transmit to a NB, a message via a first beam as part of a RACH procedure and may receive, from the NB, at least one signal for further refining the first beam during the RACH procedure.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, etc. In FIG. 1, a solid line with double arrows indicates transmissions between a UE and a serving eNB, which is an eNB designated to serve the UE on the downlink and/or uplink. A dashed line with double arrows indicates potentially interfering transmissions between a UE and an eNB.

Figure 2:
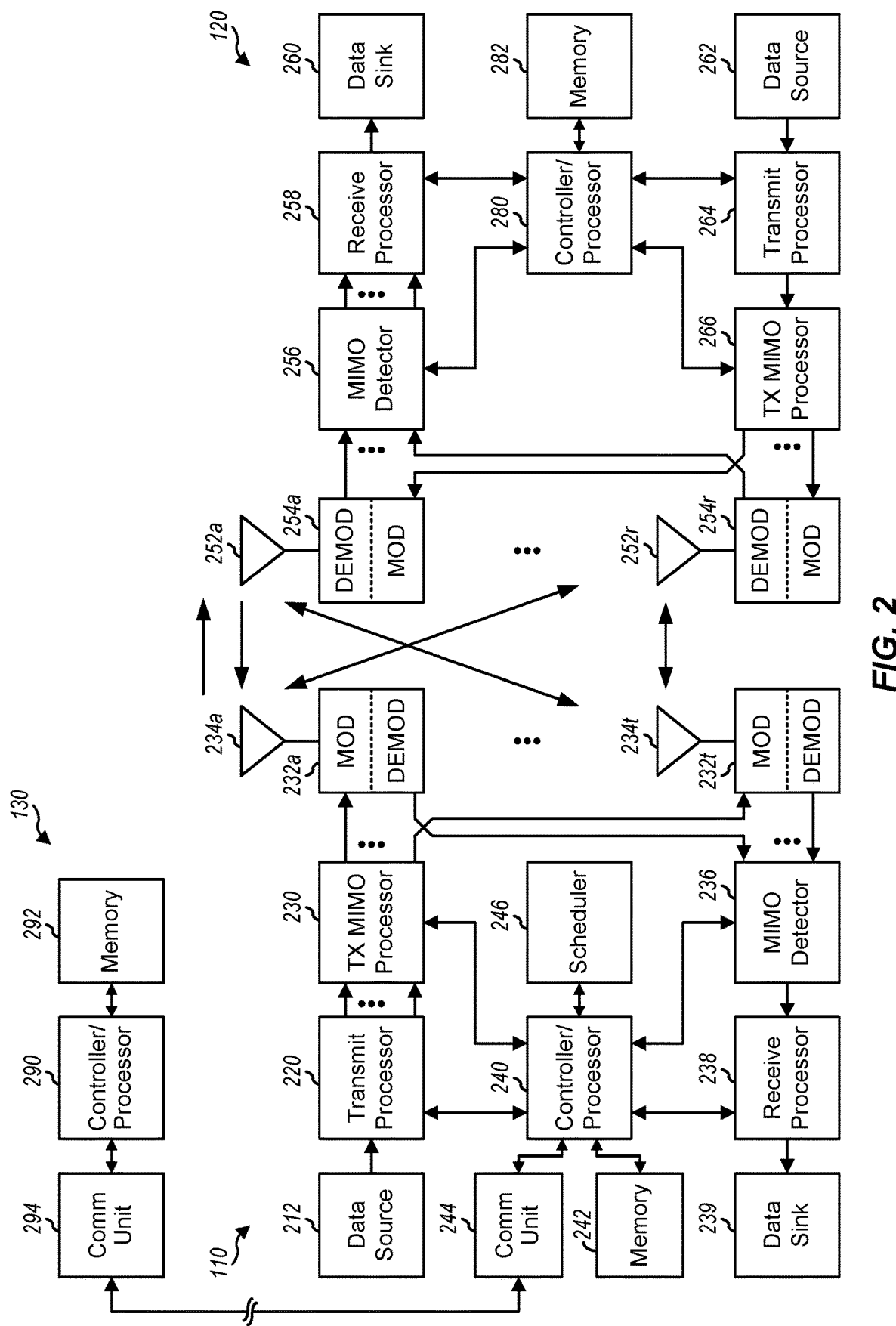
FIG. 2 shows a block diagram conceptually illustrating an example of a base station (BS) in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, Rnn, etc.

On the uplink, at UE 120, a transmit processor 264 may receive and process data from a data source 262 and control information (e.g., for reports including RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively, to perform techniques presented herein for beam refinement during a RACH procedure.

Figure 6:
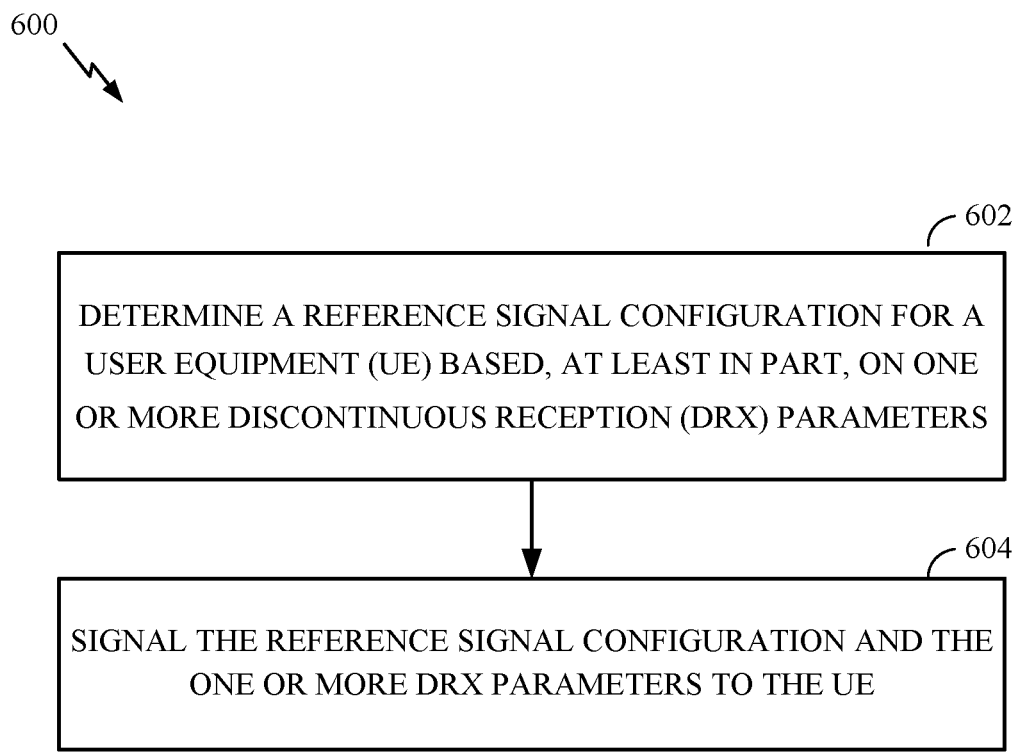
FIG. 6 illustrates example operations performed, by a base station, in accordance with certain aspects of the present disclosure.
Figure 7:
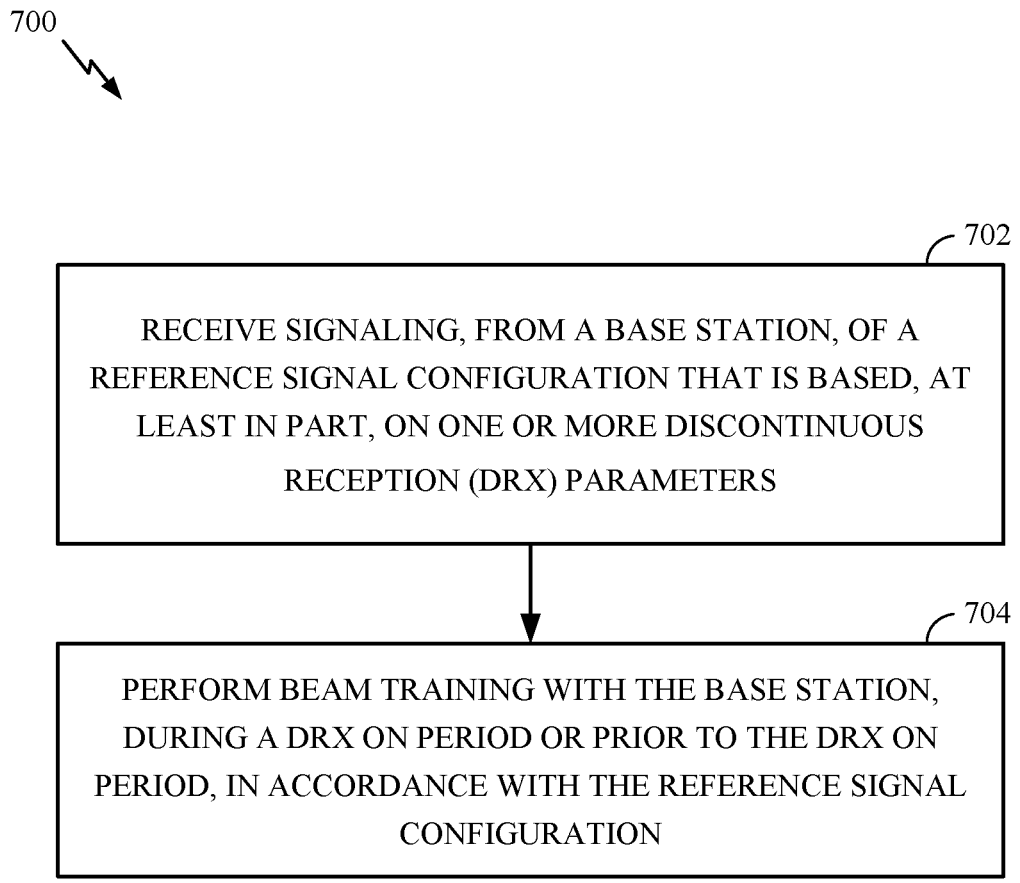
FIG. 7 illustrates example operations performed by a UE, in accordance with certain aspects of the present disclosure.

One or more modules illustrated in FIG. 2 may be configured to perform the operations described herein and illustrated in FIGS. 6-7. At the eNB, the controller/processor 240, scheduler 246, mod/demod 232, and/or antenna 234 may be configured to perform the recited and described operations. At the UE, the controller/processor 280, mod/demod 254, and antenna 252 may be configured to perform the recited and described operations.

Memories 242 and 282 may store data and program codes for base station 110 and UE 120, respectively. A scheduler 246 may schedule UEs for data transmission on the downlink and/or uplink.

Figure 3:
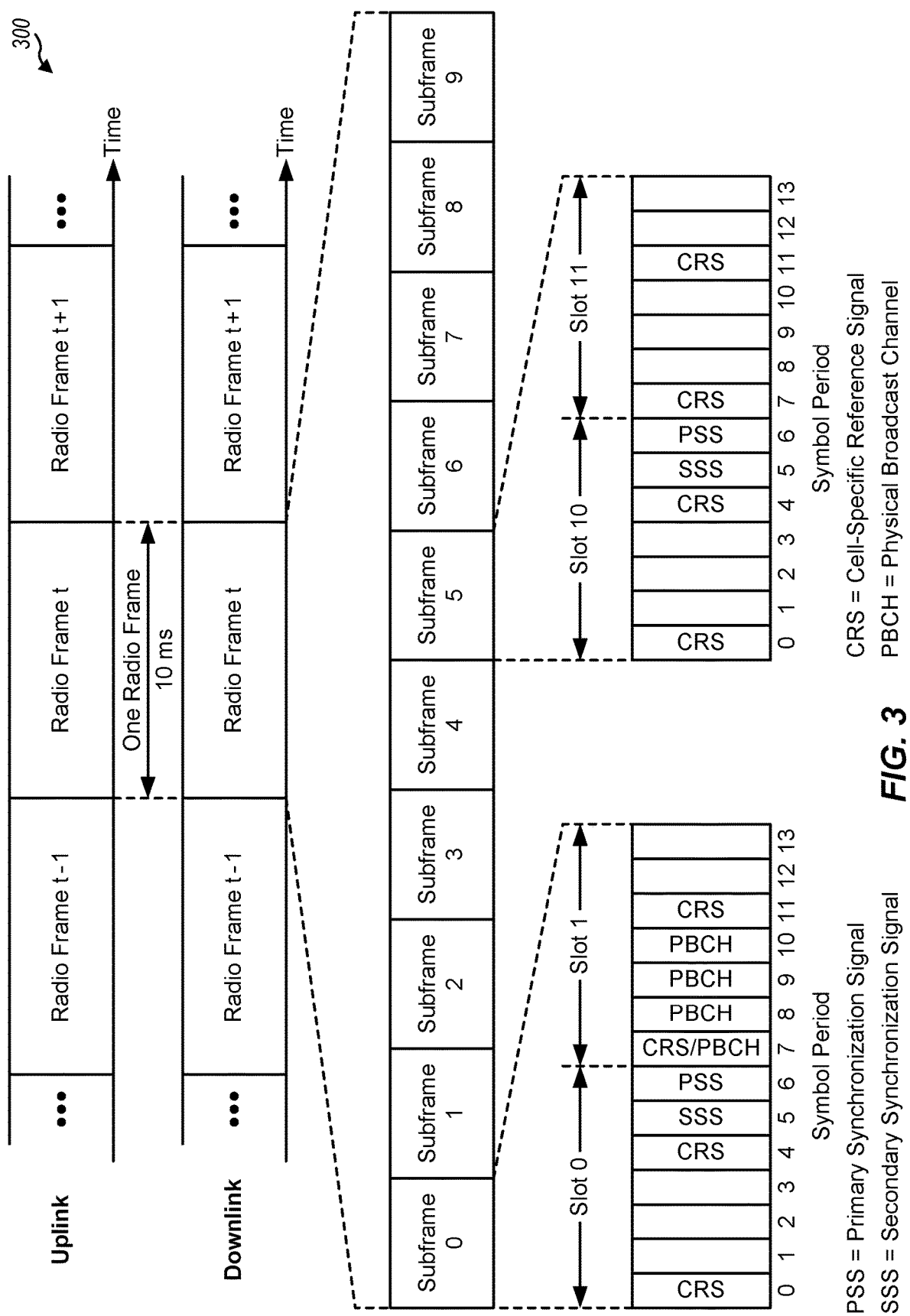
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
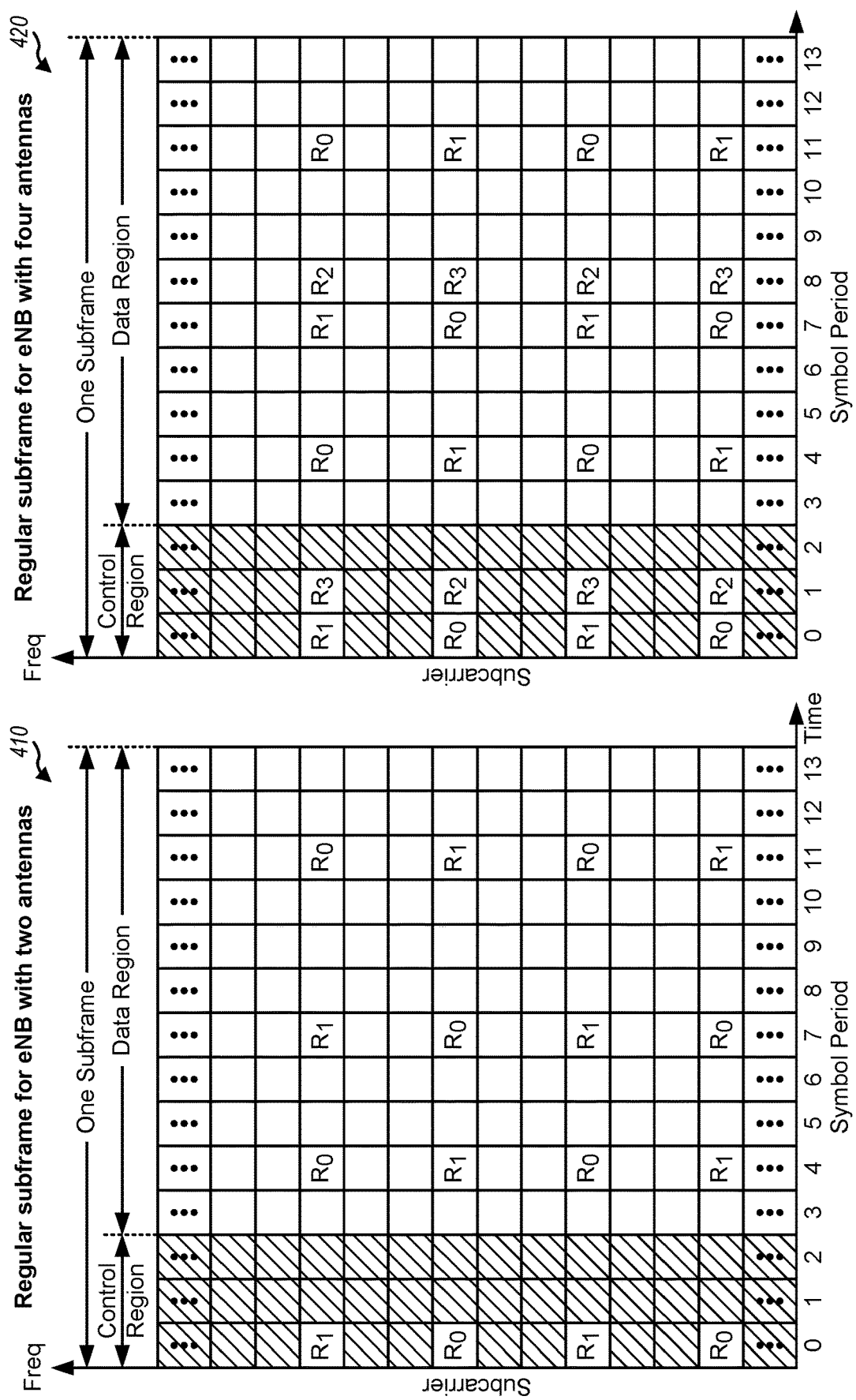
FIG. 4 is a block diagram conceptually illustrating two exemplary subframe formats with the normal cyclic prefix.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+, q+2Q, etc., where q∈{0, ..., Q−1}.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Figure 5:
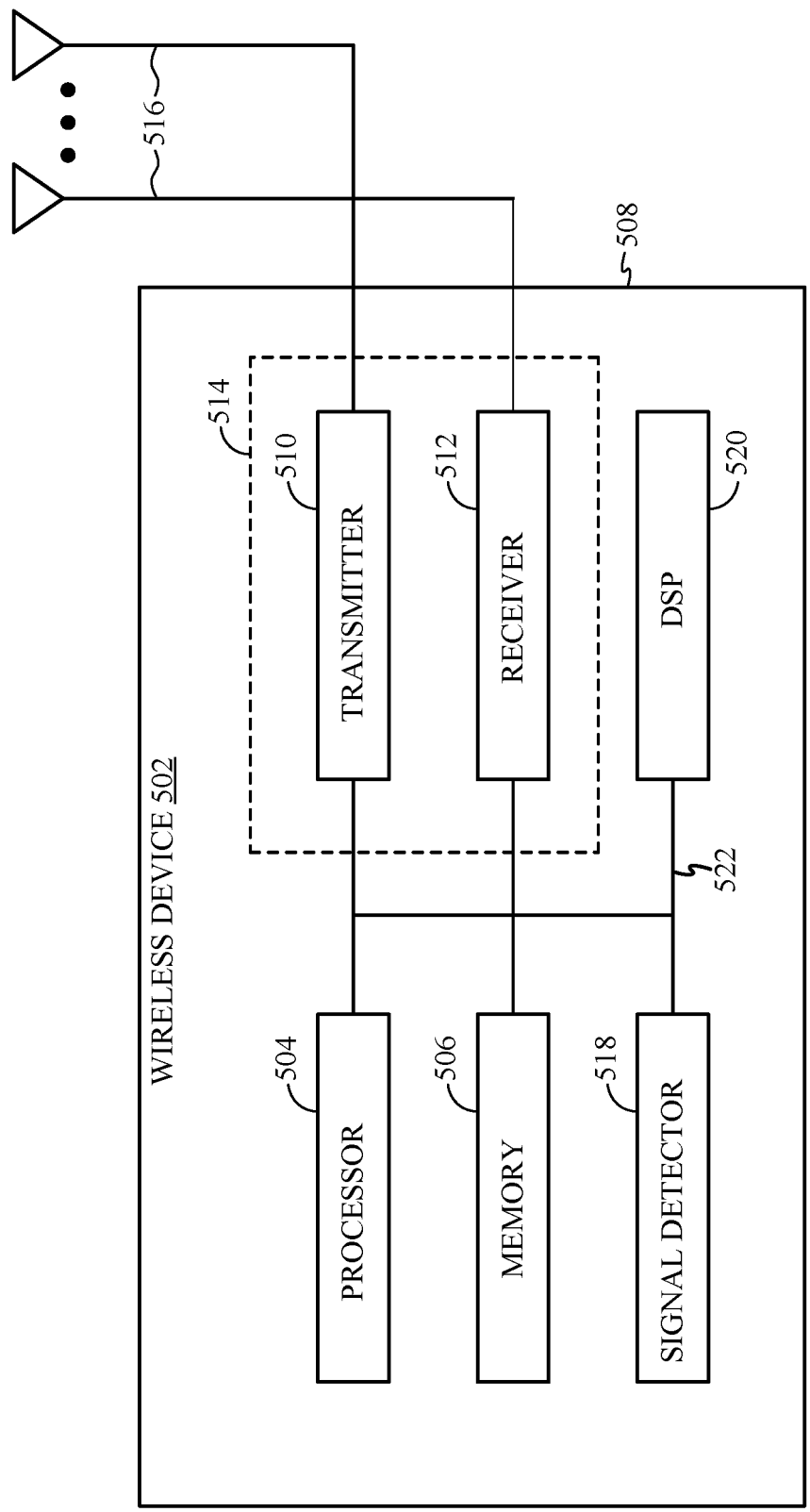
FIG. 5 illustrates various components that may be utilized in a wireless device, in accordance with certain aspects of the present disclosure.

FIG. 5 illustrates various components that may be utilized in a wireless device 502 that may be employed within the wireless communication system 100 illustrated in FIG. 1. The wireless device 502 is an example of a device that may be configured to implement the various methods described herein. The wireless device 502 may be a base station 110 or any of the wireless nodes (e.g., 120). For example, the wireless device 502 may be configured to perform operations and techniques illustrated in FIGS. 6-10 as well as other operations described herein.

The wireless device 502 may include a processor 504 that controls operation of the wireless device 502. The processor 504 may also be referred to as a central processing unit (CPU). Memory 506, which may include both read-only memory (ROM) and random access memory (RAM), provides instructions and data to the processor 504. A portion of the memory 506 may also include non-volatile random access memory (NVRAM). The processor 504 typically performs logical and arithmetic operations based on program instructions stored within the memory 506. The instructions in the memory 506 may be executable to implement the methods described herein. Some non-limiting examples of the processor 504 may include Snapdragon processor, application specific integrated circuits (ASICs), programmable logic, etc.

The wireless device 502 may also include a housing 508 that may include a transmitter 510 and a receiver 512 to allow transmission and reception of data between the wireless device 502 and a remote location. The transmitter 510 and receiver 512 may be combined into a transceiver 514. A single transmit antenna or a plurality of transmit antennas 516 may be attached to the housing 508 and electrically coupled to the transceiver 514. The wireless device 502 may also include (not shown) multiple transmitters, multiple receivers, and multiple transceivers. The wireless device 502 may also include wireless battery charging equipment.

The wireless device 502 may also include a signal detector 518 that may be used in an effort to detect and quantify the level of signals received by the transceiver 514. The signal detector 518 may detect such signals as total energy, energy per subcarrier per symbol, power spectral density and other signals. The wireless device 302 may also include a digital signal processor (DSP) 520 for use in processing signals.

The various components of the wireless device 502 may be coupled together by a bus system 522, which may include a power bus, a control signal bus, and a status signal bus in addition to a data bus. The processor 504 may be configured to access instructions stored in the memory 506 to perform beam refinement with aspects of the present disclosure discussed below.

Example Massive MIMO

Multiple-antenna (multiple-input multiple-output (MIMO)) technology is becoming common for wireless communications and has been incorporated into wireless broadband standards such as long term evolution (LTE) and Wi-Fi, for example. In MIMO, the more antennas the transmitter/receiver is equipped with, the more the possible signal paths (e.g., spatial streams) and the better the performance in terms of data rate and link reliability. Increased number of antennas may also involve increased complexity of the hardware (e.g., number of radio frequency (RF) amplifier frontends) and increased complexity and energy consumption of the signal processing at both ends.

Massive MIMO may involve the use of a very large number of service antennas (e.g., hundreds or thousands) that can be operated coherently and adaptively. The additional antennas may help focus the transmission and reception of signal energy into smaller regions of space. This may lead to huge improvements in throughput and energy efficiency, in particularly when combined with simultaneous scheduling of a large number of user terminals (e.g., tens or hundreds). Massive MIMO may be applied in time division duplex (TDD) operation and also in frequency division duplex (FDD) operation.

Example Reference Signal Configuration and Reporting

In beam management procedures used in determining a beam pairing for communications between a UE and a Node B, reference signals that may be used for measurement, such as for example one or more measurement reference signals (MRSs), may be transmitted to a UE. In response, the UE may generate a measurement report based on the reference signals, as received. The reference signals, such as MRSs for example, may be semi-static (e.g., the same pattern over time), which may allow the Node B to obtain consistent measurements, or dynamic (e.g., configured on demand for each UE).

In some cases, a Node B obtains measurements from a UE by transmitting a measurement trigger to the UE. The measurement trigger generally indicates that the UE is to perform measurements on MRS signals transmitted in certain symbols in a current or subsequent subframe. The measurement trigger may be transmitted on a physical downlink control channel (PDCCH) or in a media access control (MAC) control element (CE) (MAC-CE).

In response, the UE measures the received MRS and generates a report including one or more of the MRS-RP and MRS-ID. The report may be transmitted from the UE to the Node B over the physical uplink control channel (PUCCH) or physical uplink shared channel (PUSCH). The Node B uses the received reports to determine a beam pair for the Node B and UE to use for subsequent communications and may communicate the beam selection to the UE (e.g., in a beam switching message).

Example Reference Signal Configuration and Measurement During DRX Mode Operation In a discontinuous reception (DRX) mode of operation, a UE may go into a low power ("sleep") mode, which may also be referred to as a low power state, for a certain period of time (referred to as a DRX OFF period or duration) and wakes up again (during a DRX ON period) to check if there is any data from the network. The cycle of sleep and wake-up (DRX ON and DRX OFF) periods repeats over time.

In mmWave systems, a UE and NB may use beamforming for communication. In a connected mode (e.g., when there is data scheduled on the DL or UL), reference signals (for example CSI-RS or beam reference signal) may be sent every few milliseconds. These reference signals may be used to identify good NB-UE beam pairs for communication.

In a DRX mode (whether connected "cDRX" or idle "iDRX"), however, certain challenges may be presented when using beamforming. As described above, a UE in DRX mode goes to sleep for a certain period of time, which is typically configured by the network. During this period, the UE may change its angular orientation, move to a different location or, due to mmWave signal characteristics, the (currently used) beams may get blocked. These events may result in link degradation and failure.

Aspects of the present disclosure, provide techniques that may help maintain and/or recover the link in cDRX/iDRX mode by adjusting reference signal, such as MRS, configurations based on DRX parameters.

FIG. 6 illustrates example operations 600 that may be performed by a base station (e.g., a Node B) for configuration of MRS measurements, according to an aspect of the present disclosure.

As illustrated, operations 600 begin at 602, where the base station determines a reference signal configuration for a user equipment (UE) based, at least in part, on one or more discontinuous reception (DRX) parameters. At 604, the base station signals the reference signal configuration and the one or more DRX parameters to the UE.

FIG. 7 illustrates example operations 700 that may be performed by a UE for performing measurements based on a reference signal configuration received from a base station, according to an aspect of the present disclosure. In other words, operations 700 may be considered complementary UE-side to base station-side operations 600 shown in FIG. 6.

As illustrated, operations 700 begin at 702, by receiving signaling, from a base station, of a reference signal configuration that is based, at least in part, on one or more discontinuous reception (DRX) parameters. At 704, the UE performs beam training with the base station, during a DRX on period or prior to the DRX on period, in accordance with the reference signal configuration.

Figure 8:
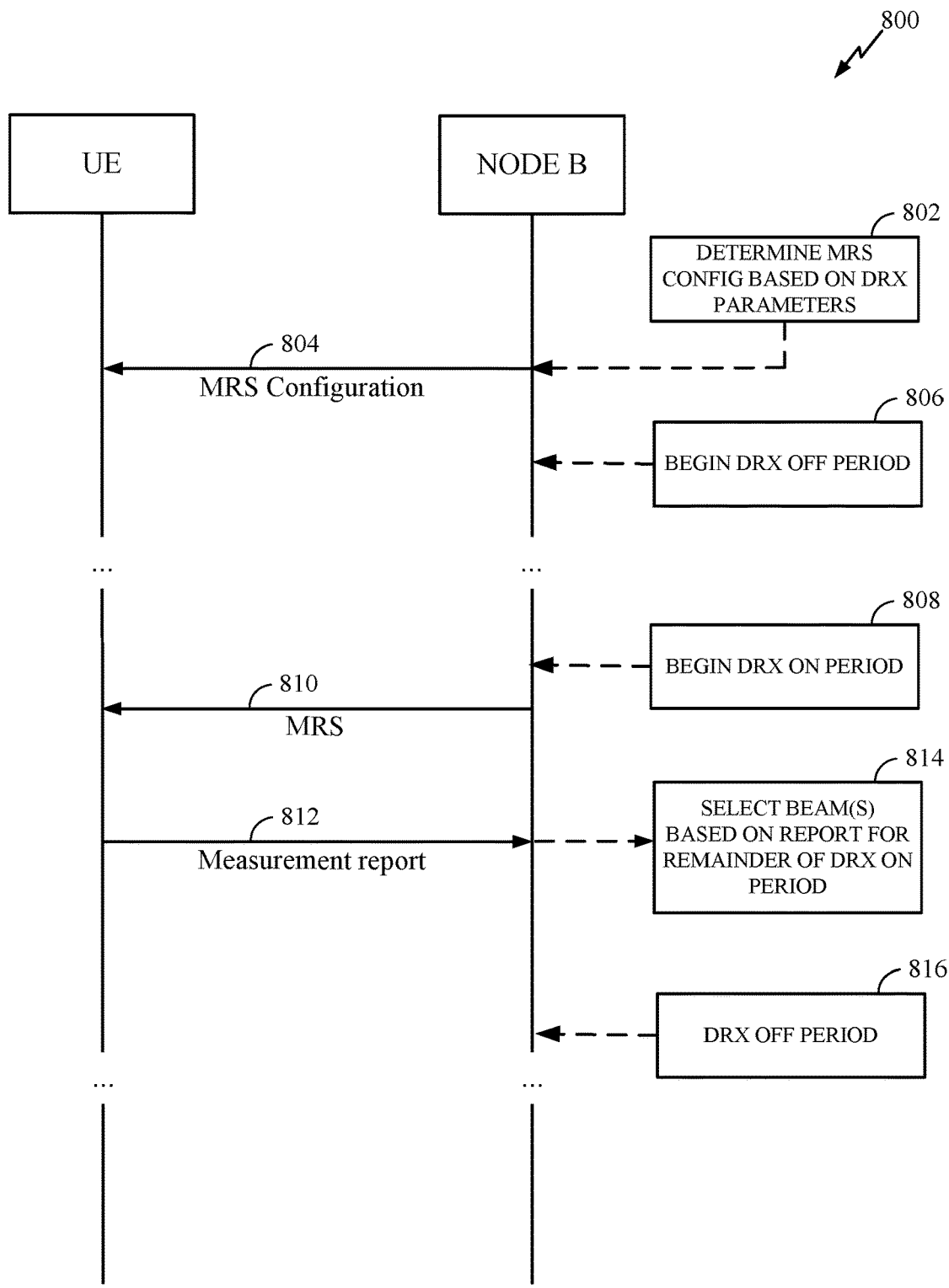
FIG. 8 is a call flow diagram illustrating an example message exchange between an NB and a UE for configuring and activating MRS training, in accordance with certain aspects of the present disclosure.

FIG. 8 illustrates a call-flow diagram 800 that shows an exchange of messages between a base station (Node B) and a UE, corresponding to the operations 600 and 700 described above.

As illustrated, at 802, the Node B determines an MRS configuration, based on DRX parameters and signals the MRS configuration to the UE, at 804. The MRS configuration may, for example, indicate a periodicity, reference signal density and location of MRSs but need not activate MRS training (e.g., MRS training may be activated by a separate message). Based on the periodicity and location information in MRS configuration, the UE may monitor for MRS transmitted from the Node B.

As will be described in greater detail below, the MRS configuration may be selected, for example, to achieve more frequent MRS training for longer DRX cycles when the UE wakes up (as there may be a greater chance of optimal beams changing while the UE was asleep). Conversely, the MRS configuration may be selected to achieve less frequent (or no) MRS training when DRX cycles are shorter.

In the illustrated example, a UE enter a DRX OFF period, at 806. The DRX ON and OFF periods may be defined by DRX parameters previously sent to the UE (or sent with the MRS configuration). At 808, the DRX ON period begins and the Node B transmits MRS (e.g., in one or more symbols of one or more subframes) at 810. The UE may perform channel measurements based on the received MRS and transmit a measurement report to the Node B, at 812. The Node B and UE may use the measurement report to select a beam, at 814, which may be used for the remainder of the DRX on period (until DRX OFF period 816). In some cases, the Node B may generate a beam switching notification (not shown) indicating a set of beams that the UE and Node B can use for subsequent communications. In some cases, the Node B may generate multiple beams to refine the existing beam based on uplink signals and may not rely on using explicit measurement feedback and beam switch notification to switch beams.

Generally the network informs the UE of DRX parameters (DRX cycle, onDurationTimer, drx-Inactivity timer, etc.) and the MRS training configuration (resource configuration, process configuration, MRS symbols, mini-slots, slots of a SF etc.). This information may be provided, for example, using RRC signaling (without actually activating MRS training).

As noted above, according to aspects of the present disclosure, the MRS configuration may be a function of DRX parameters, such as the DRX cycle duration. For example, a longer DRX cycle may have more MRS training signal upon waking up, while a shorter DRX cycle may have less or no MRS training.

During the ON duration for the UE, the network may transmit MRS as specified in the RRC signaling message. The Node B then decides the MRS beam/port to transmit, for example, based on previous reports or a last report received from the UE before sleeping.

Similarly, the UE may decide its beam/port to measure MRS based on previous or last measurements/reports.

The UE generally uses the MRS configuration to determine to process training MRS or not. For example, the UE may measure the configured MRS beam (s) and send a report on PUCCH. The Node B and UE may use the beam pairs for the remaining of ON duration.

In some cases, the UE may take action if the UE does not receive MRS training from NB for a certain period. For example, the UE may assume a link failure and send a RACH for beam recovery.

As another example, the UE may assume that there is no traffic intended for UE at this DRX on period. In other words, MRS may effectively serve as an indicator whether eNB has intention to transmit traffic to this UE in this DRX on period. The UE may then go to sleep (early) to terminate the DRX on monitoring for this DRX ON period.

In some cases, during the DRX on period and before the UE goes to sleep, the UE may transmit an MRS request. In such cases, the Node B may transmit MRS and UE reports the measurement and may go to sleep immediately after. In other cases, the UE may just send the MRS request for the next DRX ON period. In some cases, whether the UE sends an MRS request may be triggered based on buffer status at UE (e.g., if UE anticipates upcoming uplink traffic).

In accordance with one or more cases, the UE may send a message or indication that triggers an action by the base station. The message or indication may be an explicit request as described above or it may just be information that the base station processes and then triggers an action based on the processed information. In some cases, a UE may request MRS, or an adjustment/update to an MRS configuration, based on UE mobility, channel conditions, or link quality. For example, if the UE is stationary (or slow movement/low mobility), then UE may request the network to (1) make the MRS training infrequent or (2) cancel the MRS training procedure. If the UE observes that the link quality degrades over multiple wake-ups, then the UE may request the network to configure MRS training procedure (or increase frequency/amount of MRS training).

Figure 9:
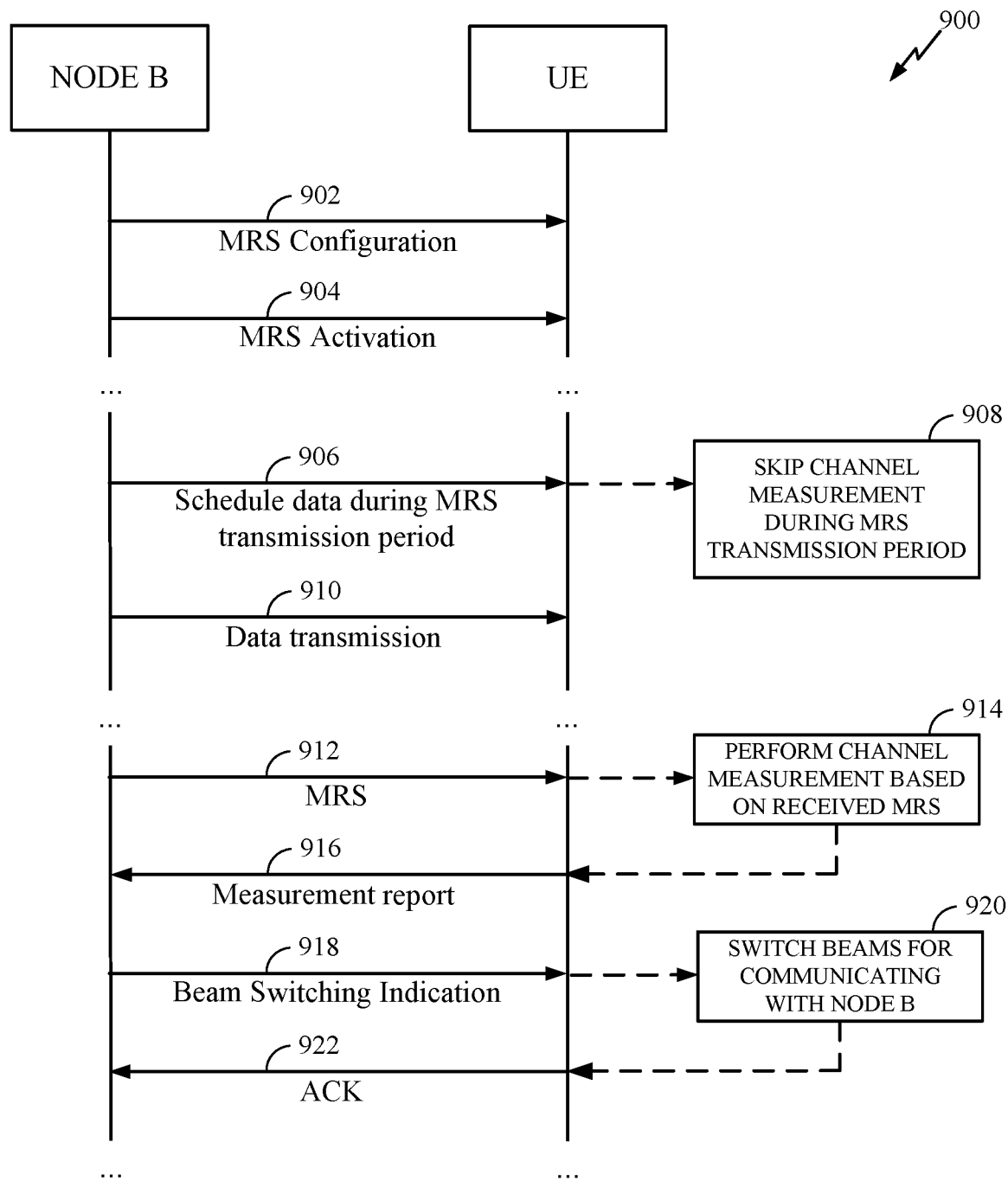
FIG. 9 is a call flow diagram illustrating an example message exchange between an NB and a UE for configuring and activating MRS training, in accordance with certain aspects of the present disclosure.

In accordance with one or more cases, FIG. 9 is a call flow diagram 900 illustrating an example message exchange between an NB and a UE for configuring and activating MRS training.

As shown in FIG. 9, a Node B may transmit MRS configuration 902 and MRS activation 904 to the UE. Further, the Node B may schedule 906 data during MRS transmission period. At this point the UE may skip 908 channel measurement during MRS transmission period. The Node B may then conduct a data transmission 910 as shown. Further, MRS may be transmitted 912 which triggers the UE to perform 914 a channel measurement based on the received MRS. The UE may then transmit a measurement report 916 to the Node B. The Node B may then transmit back a beam switching indication 918 which triggers the UE to switch 920 beams for communicating with Node B and transmit an ACK 922 to the Node B.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in figures, those operations may have corresponding counterpart means-plus-function components.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD/DVD or other optical disk storage, magnetic disk storage or other magnetic storage devices, or any other medium that can be used to carry or store program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communications by a base station, comprising:
   determining a reference signal configuration for a user equipment (UE), the reference signal configuration being a function of one or more discontinuous reception (DRX) parameters including a DRX cycle, the DRX cycle being a duration of a DRX on-period and a DRX off-period, wherein the reference signal configuration comprises: an indication of a number of reference signals, a periodicity of each of the number of reference signals, a density of each of the number of reference signals, and a location of each of the number of reference signals, wherein the number of reference signals is based on a length of the DRX cycle; and signaling the reference signal configuration and the one or more DRX parameters to the UE.

2. The method of claim 1, wherein the one or more DRX parameters comprise at least one of an, on duration timer value or an inactivity timer.

3. The method of claim 1, wherein the determining comprises:
   determining the reference signal configuration for more frequent reference signal training for the one or more DRX parameters having longer DRX cycles; or
   determining the reference signal configuration for less frequent MRS training for the one or more DRX parameters having shorter DRX cycles.

4. The method of claim 1, further comprising: receiving a request from the UE to update the reference signal configuration.

5. The method of claim 1, further comprising: communicating with the UE via a beam selected based on a previously sent reference signal report from the UE.

6. The method of claim 5, wherein the reference signal report is sent before an off cycle before going to a low power state.

7. A method of wireless communications by a user equipment (UE), comprising:
   receiving signaling, from a base station, of a reference signal configuration that is a function of one or more discontinuous reception (DRX) parameters including a DRX cycle, the DRX cycle being a duration of a DRX on-period and a DRX off-period, wherein the reference signal configuration comprises: an indication of a number of reference signals, a periodicity of each of the number of reference signals, a density of each of the number of reference signals, and a location of each of the number of reference signals, wherein the number of reference signals is based on a length of the DRX cycle; and
   performing beam training with the base station, during the DRX on-period of the DRX cycle or prior to the DRX on-period, using the reference signal in accordance with the reference signal configuration.

8. The method of claim 7, further comprising: transmitting a request to update the reference signal configuration.

9. The method of claim 7, wherein the received signaling is communicated via a beam selected based on a reference signal report from the UE.

10. The method of claim 7, further comprising: taking one or more actions if the UE does not receive reference signal training for a period of time.

11. The method of claim 10, wherein the one or more actions comprise one or more of assuming a link failure, assuming no data is intended for the UE, and exiting the DRX on-period early to enter a low power state.

12. The method of claim 7, further comprising: taking one or more actions in response to detecting a change in at least one of channel conditions or mobility of the UE.

13. The method of claim 12, wherein the one or more actions comprise at least one of sending a request for reference signal training to the base station, or, sending a request to modify the reference signal configuration to the base station.

14. The method of claim 13, wherein the one or more actions comprise sending a request to make reference signal training less frequent or to stop reference signal training if the UE is in a stationary or low mobility state, and wherein the one or more actions comprise sending a request to make reference signal training more frequent or to begin reference signal training if the UE is in a mobility state.

15. The method of claim 13, wherein the one or more actions comprise sending a request to make reference signal training more frequent or to begin reference signal training if the UE detects a degradation in link quality between DRX on cycles.

16. An apparatus for wireless communications by a base station, comprising:
   means for determining a reference signal configuration for a user equipment (UE), the reference signal configuration being a function of one or more discontinuous reception (DRX) parameters including a DRX cycle, the DRX cycle being a duration of a DRX on-period and a DRX off-period, wherein the reference signal configuration comprises: an indication of a number of reference signals, a periodicity of each of the number of reference signals, a density of each of the number of reference signals, and a location of each of the number of reference signals, wherein the number of reference signals is based on a length of the DRX cycle; and
   means for signaling the reference signal configuration and the one or more DRX parameters to the UE.

17. The apparatus of claim 16, wherein the one or more DRX parameters comprise at least one of an, on duration timer value or an inactivity timer.

18. The apparatus of claim 16, wherein the means for determining comprises:
   means for determining the reference signal configuration for more frequent reference signal training for the one or more DRX parameters having longer DRX cycles; or
   means for determining the reference signal configuration for less frequent MRS training for the one or more DRX parameters having shorter DRX cycles.

19. The apparatus of claim 16, further comprising: means for receiving a request from the UE to update the reference signal configuration.

20. The apparatus of claim 16, further comprising: means for communicating with the UE via a beam selected based on a previously sent reference signal report from the UE.

21. The apparatus of claim 20, wherein the reference signal report is sent before an off cycle before going to a low power state.

22. An apparatus for wireless communications by a user equipment (UE), comprising:
   means for receiving signaling, from a base station, of a reference signal configuration that a function of one or more discontinuous reception (DRX) parameters including a DRX cycle, the DRX cycle being a duration of a DRX on-period and a DRX off-period, wherein the reference signal configuration comprises: an indication of a number of reference signals, a periodicity of each of the number of reference signals, a density of each of the number of reference signals, and a location of each of the number of reference signals, wherein the number of reference signals is based on a length of the DRX cycle; and
   means for performing beam training with the base station, during the DRX on-period of the DRX cycle or prior to the DRX on: period, using the reference signal in accordance with the reference signal configuration.

23. The apparatus of claim 22, further comprising: means for transmitting a request to update the reference signal configuration.

24. The apparatus of claim 22, wherein the received signaling is communicated via a beam selected based on a reference signal report from the UE.

25. The apparatus of claim 22, further comprising: means for taking one or more actions if the UE does not receive reference signal training for a period of time.

26. The apparatus of claim 25, wherein the one or more actions comprise one or more of assuming a link failure, assuming no data is intended for the UE, and exiting a DRX on: period early to enter a low power state.

27. The apparatus of claim 22, further comprising: means for taking one or more actions in response to detecting a change in at least one of channel conditions or mobility of the UE.

28. The apparatus of claim 27, wherein the one or more actions comprise at least one of sending a request for reference signal training to the base station, or, sending a request to modify the reference signal configuration to the base station.

29. The apparatus of claim 28, wherein the one or more actions comprise sending a request to make reference signal training less frequent or to stop reference signal training if the UE is in a stationary or low mobility state, and wherein the one or more actions comprise sending a request to make reference signal training more frequent or to begin reference signal training if the UE is in a mobility state.

30. The apparatus of claim 28, wherein the one or more actions comprise sending a request to make reference signal training more frequent or to begin reference signal training if the UE detects a degradation in link quality between DRX on cycles.

* * * * *